V. P. McVOY.
SAFETY PLUG FOR CYLINDERS.
APPLICATION FILED JULY 3, 1920.

1,377,496.

Patented May 10, 1921.

INVENTOR
Vincen P. McVoy
BY
E. W. Bond
ATTORNEY

UNITED STATES PATENT OFFICE.

VINCEN P. McVOY, OF MOBILE, ALABAMA.

SAFETY-PLUG FOR CYLINDERS.

1,377,496.   Specification of Letters Patent.   Patented May 10, 1921.

Application filed July 3, 1920. Serial No. 393,889.

*To all whom it may concern:*

Be it known that I, VINCEN P. MCVOY, a citizen of the United States, residing at Mobile, in the county of Mobile and State of Alabama, have invented certain new and useful Improvements in Safety-Plugs for Cylinders, of which the following is a specification.

This invention relates to certain new and useful improvements in safety or relief plugs for cylinders and while especially applicable for use upon cylinders of locomotives it will be readily understood as the description proceeds that it is not necessarily restricted to such use.

The present invention has for its objects among others to provide a simple, cheap, yet efficient and reliable device readily applied, and which will dependably guard against accidents due to excessive pressure in the cylinder, from any cause. For instance, in case of breakage of the valve connections, the valve automatically assumes a mid-travel position, sealing up the steam within the cylinder, and the engine being in motion this steam is compressed within the cylinder, either bursting the cylinder, bending the piston rod or driving the piston rod through the crosshead, or some such disastrous result is caused, and the purpose of the present invention is to counteract such disastrous results.

It has for a further object to provide for the use of a portion of the mechanism for temporary or emergency repair after the gasket has been blown out by such excess pressure in the cylinder, the gasket being designed to be blown out before the pressure has reached such a point as would cause the disastrous effects above outlined.

The invention has for a further object to provide for the ready adjustment of the end member to suit conditions under which it is applied so as to direct the discharge of the steam in case of blow-out of the gasket in the desired direction, as, for instance, under the engine.

Other objects and advantages of the invention will hereinafter appear and the novel features thereof will be particularly pointed out in the appended claims.

The invention, in its preferred form, is clearly illustrated in the accompanying drawing, which, with the numerals of reference marked thereon, form a part of this specification, and in which—

Like numerals of reference indicate like parts throughout the different views.

Figure 1:
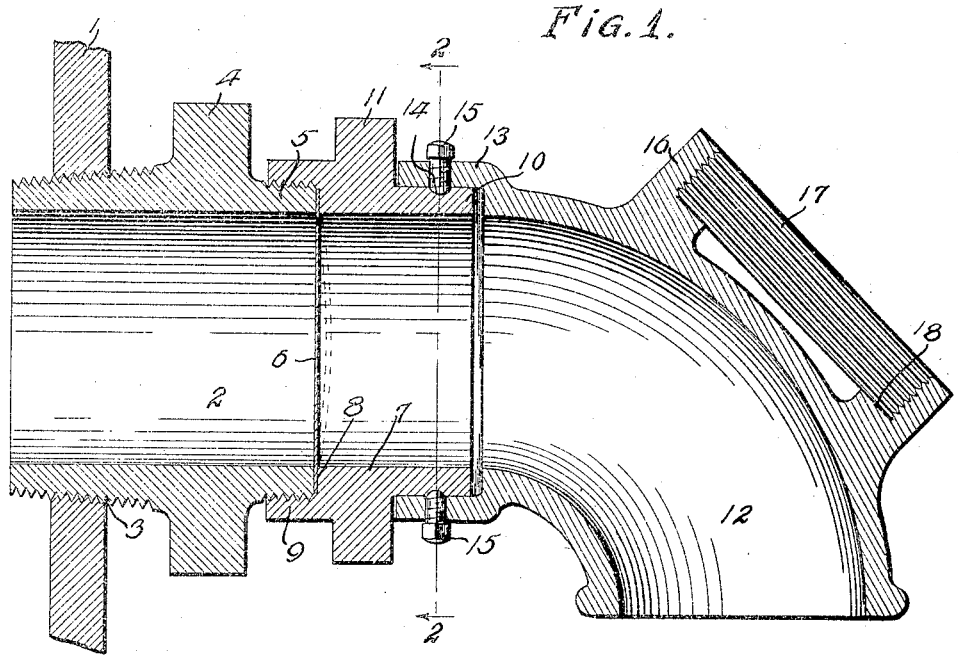
Figure 1 is a substantially central longitudinal section through a safety plug embodying my invention.

Referring to the drawings, 1 designates a portion of the wall of a cylinder head.

2 is the plug comprising a threaded nipple portion 3 at one end, a wrench-receiving portion 4 which may be hexagonal or otherwise, as preferred, and a threaded member 5 upon the other side of the portion 4.

Seated against the end of the portion 5 is a gasket 6 of any suitable material, such, for instance, as copper, although not necessarily so, and 7 is a nut having a shoulder 8 bearing against the gasket, a threaded portion 9 to engage the threaded portion 5 of the plug, and an annular extension 10, and between the ends a wrench-receiving portion 11, which may be hexagonal or otherwise, as may be found most expedient.

Figure 2:
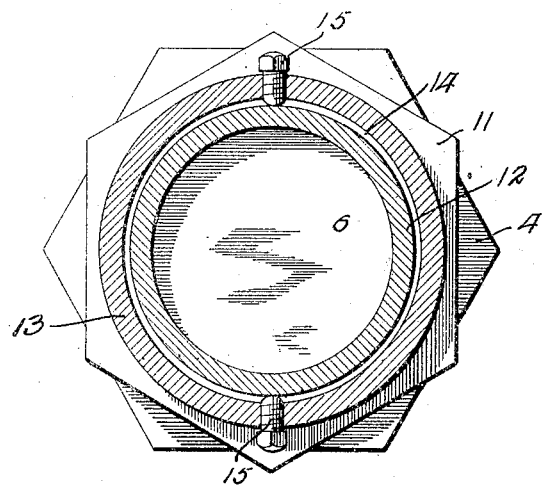
Fig. 2 is a cross section thereof on the line 2—2 of Fig. 1, looking in the direction of the arrows.

12 is an elbow or its equivalent having the annular extension 13 adapted to embrace the member 10, as shown, and in order that this elbow may be revolved or adjusted so as to bring the discharge mouth thereof into any desired position for the discharge of the steam, the member 10 is provided with an annular groove 14 adapted to receive the ends of screws or the like 15, as seen in Figs. 1 and 2, which serve to hold the parts in place, but permit of ready adjustment of the elbow member to suit the conditions of use. The elbow 12 has the angular offset portion 16 which is interiorly threaded, as at 17, and provided with the shoulder 18, these threads being designed to engage the threaded member 9 under conditions which will soon be described.

In use, the plug is screwed into the cylinder head, as shown, with the parts in the position in which they are illustrated in Fig. 1, the gasket being designed to withstand a pressure of anything say under three hundred pounds, but when a pressure in excess of this prevails in the cylinder the gasket is blown out and the steam escapes through the nut and the elbow, to the atmosphere, and all further damage is prevented. After this has occurred, the nut 7 may be removed and a new gasket put in position in case one is available, but if not the members 7 and 12 are removed together and the threaded portion 16 engaged with the threaded member 5 of the plug, thus capping the latter and permitting the engine to proceed until opportunity is had to replace the gasket.

The device is composed of few parts of such a nature as can be readily produced, and while the structural embodiment of the invention as herein disclosed is what I at the present time consider preferable, it is evident that the same is subject to changes, variations and modifications in detail, proportions of parts, etc., without departing from the spirit of the invention or sacrificing any of its advantages. I, therefore, do not intend to restrict myself to the particular construction and arrangement of parts, etc., as hereinbefore set forth, but reserve the right to make such changes, variations and modifications as come properly within the scope of the appended claims.

In some instances, the nut 7 and the elbow member 12 may be omitted and the gasket held in position by other means, of such a nature as would permit of ready blowing out of the gasket under abnormal pressure in the cylinder.

What is claimed as new is:—

1. A safety attachment for cylinders embodying a member adapted to be displaced by abnormal pressure within the cylinder, and a removable reversible elbow member adapted to serve also as a temporary cap.

2. A safety attachment for cylinders embodying a plug, a gasket and means for holding the gasket in position and permitting its rupture under abnormal pressure in the cylinder, and a removable reversible elbow member adapted to serve also as a temporary cap.

3. A safety attachment for cylinders embodying a plug, a gasket held thereto, and means directing the discharge of steam upon rupture of the gasket and serving when in reversed position as a cap to said plug.

4. A safety attachment for cylinders embodying a plug, a gasket held thereto, means directing the discharge of steam upon rupture of the gasket and serving when in reverse position as a cap to said plug, and means for adjustment of said first-named means according to conditions of use.

5. A safety attachment for cylinders embodying a plug with threaded end, means for holding a gasket against said end, and a discharge member of elbow form revolubly mounted upon said holding means.

6. A safety attachment for cylinders embodying a plug with threaded end, means for holding a gasket against said end, and a discharge member of elbow form revolubly mounted upon said holding means and having a threaded portion for engagement with the threaded end of the plug.

7. A safety attachment for cylinders embodying a plug with opposite ends threaded and an intermediate wrench-receiving portion, a nut with threaded annular portion to hold a gasket against the adjacent end of the plug, an annular portion with a groove, and a wrench-receiving portion, and an elbow member having an annular portion to embrace the grooved annular portion of the nut, and a lateral threaded extension adapted to serve as a cap for the plug upon rupture of the gasket.

8. A safety attachment for cylinders embodying a plug with opposite ends threaded and an intermediate wrench-receiving portion, a nut with a threaded annular portion, an annular portion with a groove and an intermediate wrench-receiving portion, a gasket held between said nut and plug, and an elbow member having an annular portion to embrace the grooved annular portion of the nut and a lateral threaded extension adapted to serve as a cap for the plug upon rupture of the gasket.

In testimony whereof I affix my signature.

VINCEN P. McVOY.